United States Patent [19]

Jeromson, Jr. et al.

[11] Patent Number: 4,862,572

[45] Date of Patent: Sep. 5, 1989

[54] RETAINING RING TOOL

[75] Inventors: James R. Jeromson, Jr., Aurora; J. E. C. Anderson, Moreland Hills, both of Ohio

[73] Assignee: Milbar Corporation, Chagrin Falls, Ohio

[21] Appl. No.: 202,402

[22] Filed: Jun. 2, 1988

[51] Int. Cl.[4] .......... B23P 19/04

[52] U.S. Cl. .......... 29/229; 29/268

[58] Field of Search .......... 29/268, 229; 81/302, 81/395, 427.5, 327

[56] References Cited

U.S. PATENT DOCUMENTS

| | | | |
|---|---|---|---|
| 583,596 | 6/1897 | Gaskill | 81/302 |
| 3,228,101 | 1/1966 | Madeira | 29/229 |
| 3,906,777 | 9/1975 | Dickens | 254/126 |
| 4,050,464 | 9/1977 | Hall | 29/268 |
| 4,367,577 | 1/1983 | Muff | 81/302 |
| 4,689,865 | 9/1987 | Chamblee | 29/229 |

FOREIGN PATENT DOCUMENTS

| | | | |
|---|---|---|---|
| 1251538 | 12/1960 | France | 29/229 |

*Primary Examiner*—Robert C. Watson
*Attorney, Agent, or Firm*—Watts, Hoffmann, Fisher & Heinke Co.

[57] ABSTRACT

A tool for installing and removing both internal and external large retaining rings. The tool includes a pivotally interconnected pair of lever arms. Each lever arm includes a retainer ring engagement tip. The tool further comprises a lever arm actuator including a shaft to which one of the lever arms is threadably connected and the other is axially fixed. The actuator includes a crank coupled to the shaft for rotating the shaft.

16 Claims, 1 Drawing Sheet

RETAINING RING TOOL

TECHNICAL FIELD

The present invention relates generally to tools and in particular specialized pliers for removing and installing resilient retaining rings.

BACKGROUND ART

Resilient retaining rings such as "snap rings," are employed to maintain the position of elements on shafts and within bores. To facilitate removal and installation, rings are formed with apertures near their ends by which such a ring is engaged by a suitable tool and then either expanded or contracted.

Retaining rings used to retain elements such as bearings, gears or pulleys on shafts are known as "external" rings. An external ring normally engages an annular groove formed in a shaft to inhibit axial movement of a shaft mounted element. The external-type ring is installed by expanding the ring until its diameter is greater than the shaft diameter.

A retaining ring used to retain an element such as a bearing or shaft within a bore is known as an "internal" ring. In order to install an internal-type ring it is contracted in order to pass into the bore and then allowed to expand into an internal groove formed around the bore.

Hand tools for installing and removing retaining rings are available, as for example those described in J. Edward C. Anderson's U.S. Pat. Nos. 4,621,401 and 4,625,379. Most known hand tools are not suitable for manipulating very large snap rings which may be of the order of a foot in diameter and even larger. One tool used for manipulating such large rings comprises two crossed arms pivotally connected together, one of which includes a ratchet wheel. The operator forces the retaining ring open or closed by opening or closing the arms stepwise while the ratchet prevents the elastic forces from restoring the ring to its original shape.

One difficulty with this approach is that the handles must be very long in order to provide sufficient mechanical advantage for the operator to manually deform the ring. Since the tool is so long, it is clumsy to manipulate, particular in narrow places. Furthermore, the tool requires great operator strength and stamina.

As an alternative an hydraulic tool has been proposed as disclosed in U.S. Pat. No. 4,351,097 to Hashimoto et al. The proposed tool is likewise difficult to use since an operator must manually pump fluid from an internal hydraulic fluid reservoir. The pump and reservoir increase the weight and complexity of the tool. Further, the Hashimoto proposal requires different and interchangeable complex cam actuated mechanisms for internal and external rings.

DISCLOSURE OF THE INVENTION

The present invention provides a new and improved tool for removing and installing retaining rings. The tool is adapted to manipulate large retaining rings.

In the preferred embodiment, the tool comprises a pivotally connected pair of lever arms. Each of the lever arms includes a tip structure capable of engaging a retaining ring during manipulation. The arms also include actuator portions remote from the tips.

A pivot structure is provided. This structure includes a tooth formed on one of the lever arms and a mating groove formed in the other. This structure also includes a plate or bridge pivotally connected to each of the lever arms such that the tooth and mating groove remain in engagement as the lever arms pivot.

In use, the arms are driven by a screw actuator including a transversely disposed rotatable shaft. One of the lever arms is threadably engaged with the shaft. The preferred actuator includes a crank arm. The crank arm is coupled to the shaft through a coupling which, together with collars affixed to the shaft, restrains the other of the lever arms axially of the shaft.

The tool is equipped with ring engaging tips which are removably connected to the arms as is now conventional with many snap ring pliers. The tips are removable to permit selection of tips of appropriate size and ring engaging attitude for a ring to be manipulated.

One of the outstanding features of the invention is that the tool is fully suited for manipulating either internal or external ring pliers without any manipulation of the tool other than changing of the tips. Expressed another way, prior tools which provided both internal and external ring manipulation capabilities with essentially the same mechanical advantage required some mechanical modification such as (a) removal of a pivot to permit plier arms to be selectively crossed for external rings or side-by-side for internal, or (b) manipulation of the latch members 30, 31 of Anderson's referenced '401 patent.

The tool of this invention provides an implement for manipulating retaining rings which is neither clumsy nor excessively heavy. The tool is easy to construct and requires few working parts. Since force is applied to the lever arms through a screw actuator rather than solely through the lever arms themselves, a greater mechanical advantage is possible with shorter lever arms and thus without requiring the lever arm ends remote from the tips to be spread as widely. Since the tool requires few parts and relatively small lever arms, it is light, fully portable and simple to use.

Additional features will become apparent and a fuller understanding obtained by reading the following detailed description made in connection with the accompanying drawings.

BEST MODE FOR CARRYING OUT THE INVENTION

Figures 1, 2, 3:
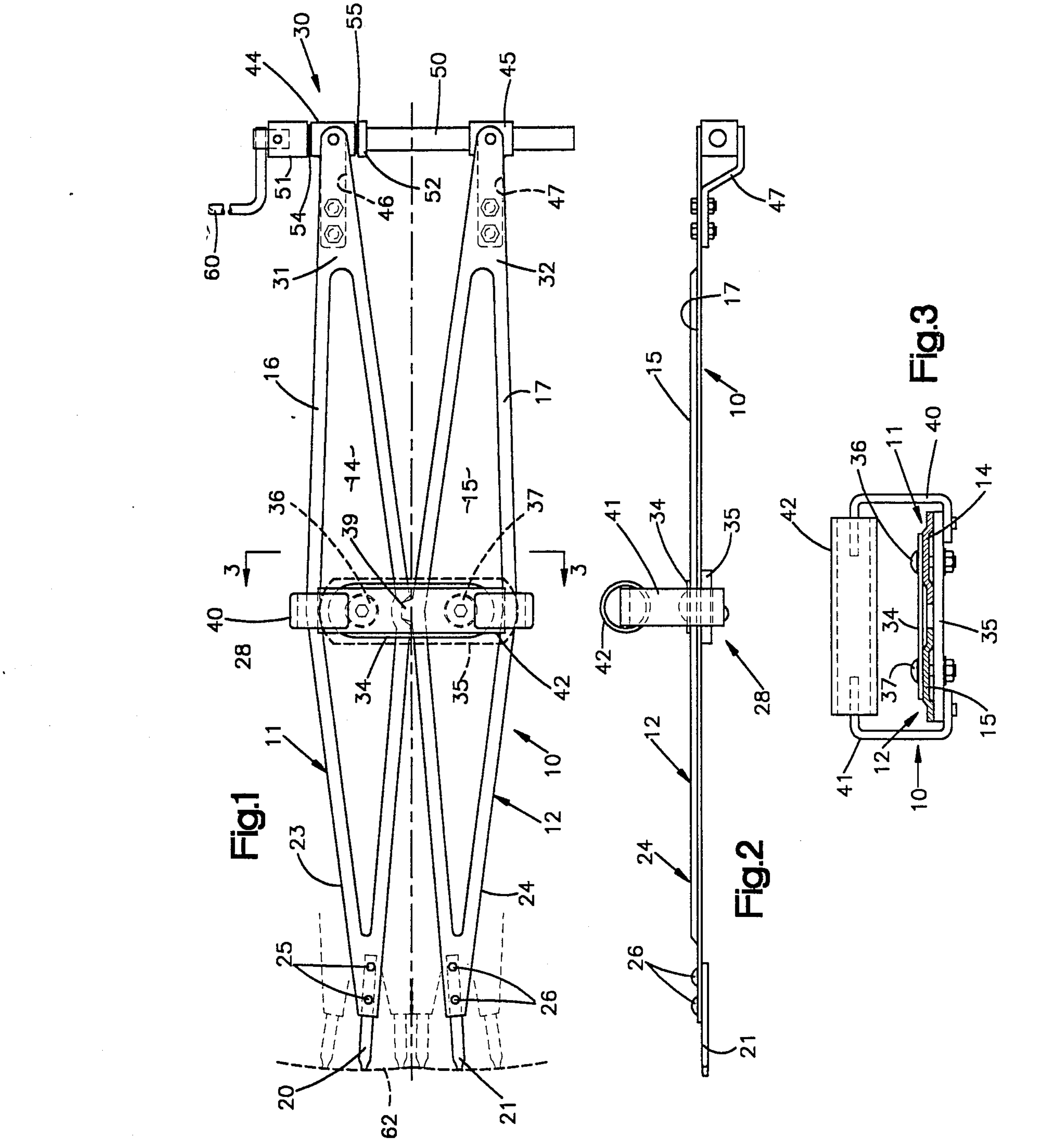
FIG. 1 is a plan view of the retaining ring tool of this invention with the handle shown in phantom for clarity of illustration.
FIG. 2 is a side view of the same tool with the shaft, crank arm, socket drive and collar removed.
FIG. 3 is a sectional view of the tool as seen from the plane indicated by line 3—3 of FIG. 1.

Referring now to the drawings and to FIG. 1 in particular, a plier tool embodying the invention is shown generally at 10. The tool includes a pair of lever arms 11, 12. the lever arms are preferably stampings including raised central portions 14, 15. The arms 11, 12 also include perimeteral border portions 16, 17 surrounding the raised central portions 14, 15, respectively.

A pair of ring-engaging tips 20, 21 are provided. The ring-engaging tips 20, 21 are respectively connected to work performing portions 23, 24 of the lever arms 11, 12 by threaded fasteners 25, 26.

The lever arms 11, 12 are connected together and maintained in their side-by-side relationship by a pivot structure shown generally at 28. The arms are also interconnected by an actuator shown generally at 30. The actuator is connected to actuating portions 31, 32 of the arms 11, 12 at the arm ends remote from the tips 20, 21.

The pivot structure 28 includes upper and lower bridges 34, 35. The bridges are connected together by pivot fasteners 36, 37 which respectively project through the arms 11, 12 to provide pivots for the arms.

The pivots 36, 37 are centrally located longitudinally speaking, and transversely aligned at a location midway between the tips 20, 21 and the actuator 30. A toothed interconnection between the arms 11, 12 is provided at 39. The toothed interconnection comprises a projection from the arm 12 which extends to a complemental recess in the arm 11. The toothed interconnection assures equal and opposite rotational movement of the arms about their respective pivots 36, 37.

A spaced pair of handle brackets are respectively connected near the ends of the lower bridge 35. A handle 42 is carried by the brackets 40, 41. Since the pivot structure 28 is located centrally of the tool, longitudinally speaking, the handle 42 is over the tool's center of gravity providing a convenient mechanism for manual support of the tool.

The actuator includes smooth bore and threaded bore blocks 44, 45. The blocks 44, 45 are respectively fixed to the actuator portions 31, 32 both directly and by brackets 46, 47.

A threaded shaft 60 projects through the smooth bore block 44 and is in threaded engagement with the threaded bore block 45. Handle and locating collars 51, 52 are fixed to the shaft 50 on opposite sides of the smooth bore block 44. Thrust bearings 54, 55 are respectively interposed between the handle and locating collars and the smooth bore block. Thus, the handle and locating collars 51, 52 coact with the smooth bore block 44 to fix the shaft axially speaking relative to the lever arm 11 while permitting free rotation of the shaft within the block 44.

A handle 60 is connected to the handle collar 51. Rotation of the handle 60 will effect rotation of the screw 50. Depending on the direction of rotation, the screw 50 will thread into or out of the threaded block 45 causing relative pivotal movement of the arms 11 and 12.

In operation, the operator first assures that tips of the appropriate size and angular orientation for a snap ring to be manipulated are secured to the work performing ends of the arms 11, 12. Assuming the operator wishes to position or remove an external ring, the handle 60 is then rotated in a clockwise direction to spread the actuating portions 31 and cause toothed interconnection coordinated pivoting of the two arms about their pivots 36, 37 until the tips are in the position shown in phantom and labeled "external position" in FIG. 1.

Once the external ring has been engaged by the tips the operator supports the tool with the tool handle 42 and rotates the actuator handle 60 in a clockwise direction until the tips reach the solid line position of FIG. 1. Thereupon the tool is either advanced over the shaft to position the ring on the shaft or withdrawn to pull the ring from the shaft. Assuming the ring is being positioned on the shaft, the operator aligns the ring with a shaft groove and then again counterclockwise rotates the actuator handle 60 until the ring is relaxed and in the groove whereupon the tips are withdrawn from the ring.

Assuming internal ring tips are mounted and an internal ring is to be removed from a bore, one positions the tips in the phantom line position of FIG. 1 labeled "internal position". The tips are then caused to engage a ring represented by the line 62. If the screw 50 is a right-handed threaded screw, the handle 60 is operated to rotate the screw in the counterclockwise direction to move the tips from the phantom line internal position to the solid line position and thus compress the ring for removal or insertion. If the ring is being mounted, the operator aligns the ring with its groove and then rotates the screw counterclockwise until the ring is in the groove and the tool may be removed.

While preferred embodiments of this invention have been described in detail, it will be apparent that certain modifications or alterations can be made therein without departing from the spirit or scope of the invention set forth in the appended claims.

We claim:

1. A tool for removing and installing resilient retaining rings comprising:

(a) a pair of lever arms, each lever arm including an associated retaining ring engagement means;

(b) a pivot structure pivotally interconnecting the arms for coordinated equal and opposite pivotal movement;

(c) an actuator including a shaft threadably engaged with a first of the lever arms and axially fixed to a second of the lever arms; and (d) a handle affixed to the pivot structure.

2. The tool of claim 1 wherein the actuator includes a crank arm.

3. The tool of claim 2 wherein the crank arm is coupled to the shaft through a coupling and the second lever arm is axially restrained between collars affixed to the shaft.

4. A retaining ring plier tool comprising:

(a) a pair of lever arms arranged in side-by-side relationship;

(b) a pivot structure including a bridge and a pair of pivots respectively connecting the arms to the bridge intermediate the ends of the arms;

(c) the arms including ring engaging portions near work performing ends of the arms;

(d) the arms also including actuating portions near the ends of the arms opposite the ring engaging portions; and (e) the arms including one of the arms including a tooth projecting into a coacting groove in the other of the arms to provide a toothed interconnection whereby when an external ring is engaged by the engaging portions the ring will be expanded as the actuating portions are moved toward one another and when an internal ring is engaged the ring will be contracted by moving the actuating portions away from one another.

5. The tool of claim 4 wherein an actuator is connected to the actuating portions.

6. The tool of claim 5 wherein the actuator comprises:

(a) threaded and smooth bored blocks each connected to a different one of the actuator portions;

(b) a shaft threadedly connected to the thread block and extending through the smooth bored block; and (c) collar structure axially fixing the shaft relative to the smooth bored block.

7. The tool of claim 1 wherein the pivot structure includes a tooth formed on one of the lever arms and a mating groove formed on the other of the lever arms.

8. The tool of claim 7 wherein the pivot structure further comprises a plate pivotally connected to each of the lever arms whereby the tooth and mating groove remain in engagement while the lever arms rotate with respect to the pivots.

9. The tool of claim 1 wherein the actuator includes a crank arm.

10. The tool of claim 9 wherein the crank arm is coupled to the shaft through a coupling and the second lever arm is axially restrained between collars affixed to the shaft.

11. An apparatus for removing or installing resilient retaining rings comprising:

(a) first and second lever arms, each of said first and second arms having a retaining ring engaging means near a work performing end and said first arm having a threaded bore near an end opposite the work performing end;

(b) a pivotal coupling between said lever arms, the coupling including first and second pivots pivotally connected to the first and second arms respectively;

(c) a threaded shaft;

(d) a rotatable coupling of the threaded shaft to an end of said second lever arm opposite the work performing end;

(e) a threaded coupling of the threaded shaft into the threaded bore;

(f) means for rotating the threaded shaft, thereby pivoting one of said first and second lever arms relative to teh other of said arms; and (g) one of the arms including a tooth projecting into a coacting groove in the other of the arms whereby to assure equal and opposite movement of the arms.

12. An apparatus according to claim 11 wherein the pivotal coupling between the first and second lever arms includes a tooth on one of said first and second lever arms and a mating groove on another of said first and second arms.

13. An apparatus according to claim 12 wherein the pivotal coupling between the first and second lever arms also includes a plate pivotally connected to each of the lever arms whereby the tooth and mating groove remain in engagement while the lever arms rotate with respect to the pivots.

14. An apparatus according to claim 11 wherein the means for rotating the threaded shaft includes a crank arm.

15. An apparatus according to claim 14 wherein the crank arm is coupled to the shaft through a coupling and the rotatable coupling of the threaded shaft to the end of said second lever arm includes the coupling and a collar fixed on the threaded shaft.

16. A tool for removing and installing resilient retaining rings comprising:

(a) a pair of lever arms, each lever arm including an associated retaining ring engagement means;

(b) a pivot structure pivotally connected to each of the arms and interconnecting the arms for coordinated equal and opposite pivotal movement; and (c) an actuator including a shaft threadably engaged with a first of the lever arms and axially fixed to a second of the lever arms;

(d) said pivot structure including a tooth formed on one of the lever arms and a mating groove formed on the other of the lever arms, the pivot structure further comprises a plate pivotally connected to each of the lever arms whereby the tooth and mating groove remain in engagement while the lever arms rotate with respect to the pivots.

* * * * *